United States Patent [19]

Hutchings et al.

[11] Patent Number: 4,899,398

[45] Date of Patent: Feb. 13, 1990

[54] IN-TANK TOILET DISPENSER

[75] Inventors: Richard S. Hutchings, Cincinnati, Ohio; Carey B. Bottom, Overland Park, Kans.

[73] Assignee: The Drackett Company, Cincinnati, Ohio

[21] Appl. No.: 253,815

[22] Filed: Oct. 5, 1988

Related U.S. Application Data

[62] Division of Ser. No. 59,352, Jun. 8, 1987, Pat. No. 4,787,984.

[51] Int. Cl.$^4$ .............................................. E03D 9/02
[52] U.S. Cl. ................................ 4/228; 252/174.11; 252/174.24; 252/180
[58] Field of Search .................. 4/227, 228, DIG. 9, 4/DIG. 10; 210/749, 698, 916; 134/2, 3, 22.19; 252/82, 121, 173, 174.11, 174.24; 422/5, 17

[56] References Cited

U.S. PATENT DOCUMENTS

| | | | |
|---|---|---|---|
| 3,684,720 | 8/1972 | Richardson | 252/86 |
| 3,721,629 | 3/1973 | Goodenough | 252/105 |
| 3,734,874 | 5/1973 | Kibler et al. | 260/29.2 E |
| 3,779,993 | 12/1973 | Kibler et al. | 260/755 |
| 3,790,610 | 2/1974 | Lum et al. | 260/429 J |
| 4,048,066 | 9/1977 | Cuisia et al. | 210/58 |
| 4,049,467 | 9/1977 | Rubin | 134/2 |
| 4,087,360 | 5/1978 | Faust et al. | 210/58 |
| 4,129,423 | 12/1978 | Rubin | 51/304 |
| 4,233,196 | 11/1980 | Sublett | 260/29.2 N |
| 4,283,300 | 8/1981 | Kurtz | 252/95 |
| 4,300,580 | 11/1981 | O'Neill et al. | 132/7 |
| 4,302,350 | 11/1981 | Callicott | 134/3 |
| 4,304,900 | 12/1981 | O'Neill | 528/290 |
| 4,304,901 | 12/1981 | O'Neill | 528/290 |
| 4,335,220 | 6/1982 | Coney | 523/414 |
| 4,374,572 | 2/1983 | Callicott | 239/37 |
| 4,428,872 | 1/1984 | Callicott | 252/174.24 |
| 4,438,015 | 3/1984 | Huber | 252/174.24 |
| 4,452,713 | 6/1984 | Small | 252/99 |
| 4,457,847 | 7/1984 | Lorenc et al. | 210/698 |
| 4,683,072 | 7/1987 | Holdt et al. | 4/228 |
| 4,687,592 | 8/1987 | Collins et al. | 252/174.24 |
| 4,722,802 | 2/1988 | Hutchings et al. | 252/174.23 |
| 4,786,433 | 11/1988 | Marquardt et al. | 252/174.24 |
| 4,787,984 | 11/1988 | Hutchings et al. | 252/180 |

OTHER PUBLICATIONS

Publ. No. GN-356, Eastman ® AQ 29, 38 and 55 Polymers for Use in Water-Based Inks, Eastman Chemicals (7/84).

*Primary Examiner*—Peter Hruskoci
*Attorney, Agent, or Firm*—Charles J. Zeller

[57] ABSTRACT

Treatment of water-containing reservoirs with a cleaning composition including a water-dissipatable polyester polymer, the polyester polymer concentration in the reservoir being in an amount effective to capture heavy metal ions, thereby inhibiting staining. In a preferred embodiment, the polyester complexes a perfume, the perfume being released in dilute solution as in the reservoir, whereby a fragrance bloom is provided to the environment.

9 Claims, No Drawings

IN-TANK TOILET DISPENSER

This is a divisional application of U.S. application Ser. No. 059,352, filed June 8, 1987, now U.S. Pat. No. 4,787,984.

FIELD OF INVENTION

The present invention concerns treatment of water-containing reservoirs, the water therein containing heavy metal ions that may stain the reservoir surfaces. More specifically, the invention concerns treatment of toilet bowls with a cleaning composition including a water-dissipatable polyester polymer, the polyester polymer concentration in the bowl water after a flush being in an amount effective to capture the heavy metal ions in the bowl water, thereby inhibiting staining. In a particularly preferred embodiment of the present invention, the polyester polymer contained in the cleaning composition complexes a perfume, the perfume being released in dilute solution as in the bowl, whereby a fragrance bloom is provided to the environment and whereby the polyester polymer is available in the bowl water, having released the sequestered perfume, to capture the heavy metal ions present in the bowl water.

BACKGROUND OF INVENTION

The polyester polymers found to be of utility in the practice of the present invention are water-dissipatable polymers such as disclosed in U.S. Pat. No. 4,335,220 to Coney entitled "Sequestering Agents and Compositions Produced Therefrom." According to the Coney patent, certain polymeric polyesters that comprise the reaction products of (a) at least one difunctional dicarboxylic acid; (b) at least one difunctional sulfomonomer containing at least one metal sulfonate group attached to an aromatic nucleus, the functional groups being hydroxy, carboxyl or amino, and (c) a glycol or a glycol and diamine mixture, the diamine having two —NRH groups and the glycol containing two —CH$_2$OH groups of which at least 0.1 mole percent, based on the total mole percent of hydroxy or hydroxy and amino equivalents, is a poly(ethylene glycol) having the structural formula H(OCH$_2$—CH$_2$)$_n$OH, n being an integer of 2 and about 500, with the proviso that the mole percent of the poly(ethylene glycol) within the range is inversely proportional to the quantity of n within the range, said polyester as defined above having an inherent viscosity of at least about 0.1 as defined in the Coney patent and including the reaction products based on the ester forming or esteramide derivatives of said reactants (a), (b), and (c), are suitable to sequester finely divided water insoluble, hydrophobic, deformable organic substances of low dipole moment, i.e., from 0 to 1.8. Examples of such substances are recited by Coney at column 6, lines 12-21 and include sucrose esters, aromatic organic compounds, aliphatic or alicyclic organic compounds, paraffins, vegetable oils, etc. The Coney patent is incorporated herein by reference.

Kibler et al U.S. Pat. Nos. 3,779,993; 3,734,874 and Sublett U.S. Pat. No. 4,233,196 also each relate to compositions comprising an aqueous dissipation of polymers described as linear, water dissipatable, meltable polyesters or polyesteramides prepared from the reaction of glycol, dicarboxylic acid, and difunctional monomer components. Each of these patents disclose that the difunctional sulfomonomer component of the polyesters or polyesteramides therein disclosed may advantageously be a dicarboxylic acid or ester thereof containing a metal sulfonate group, a glycol containing a metal sulfonate group or a hydroxy acid containing a metal sulfonate group, the metal ion of the sulfonate salt being Na$^+$, Li$^+$, Mg$^+$, Ca$^{++}$, Cu$^{++}$, Ni$^{++}$, Fe$^{++}$, Fe$^{+++}$, or the like.

O'Neill et al U.S. Pat. Nos. 4,304,900 and 4,304,901 also each disclose water-dissipatable polyesters or polyesteramides wherein at least one part of the monomeric components from which there is derived is a polycarboxylic acid or polyhydric alcohol containing a sulfonic acid salt moiety derived from a nitrogen containing base, the polymers being useful as adhesives, coatings, films and the like.

Small U.S. Pat. No. 4,452,713; Callicott U.S. Pat. Nos. 4,374,572, 4,302,350, and 4,428,872; Faust et al U.S. Pat. No. 4,087,360; Kurtz U.S. Pat. No. 4,283,300; and Rubin U.S. Pat. Nos. 4,049,467 and 4,129,423 disclose managanese stain removal/retardation methods and compositions, suitable for use, for example, in connection with toilet cleaning and automatic dishwashing using an oxidizing agent.

The Callicott, Faust et al and Kurtz patents concern the use of polymeric materials, e.g., polyacrylics, partially hydrolyzed polyacrylamides, sodium polyacrylates, and ethylene-maleic anhydride copolymers. Small concerns the use of glassy phosphate, while Rubin concerns the use of dihydroxy maleic acid, dihydroxy tartaric acid, and their alkali metal salts.

Goodenough U.S. Pat. No. 3,721,629 discloses a composition and method for removing ion stains from porcelain, the composition containing a chelate agent able to couple Fe$^{+++}$ and a soluble Fe$^{++}$ salt, the composition having a pH between 1.5 and 4.5.

SUMMARY OF INVENTION

It is an object of the present invention to provide an in-tank toilet dispenser containing a cleaning composition including a water-dissipatible polyester which inhibits staining of heavy metal ions.

Yet another object of the present invention is to sequester a perfume with the polyester in the composition, said perfume being released to the atmosphere subsequent to treatment of the reservoir.

These and other objects and advantages will be more readily apparent upon reading the detailed description of the invention, a summary of which follows.

According to the method of the present invention, a water-dissipatible polyester polymer which is the reaction product of (a) a difunctional acid, (b) a difunctional sulfonomer, and (c) a glycol or glycol and diamine mixture, the polymer having an inherent viscosity (as hereinafter defined) of at least 0.1, preferably above about 0.3, is dispensed into the water-containing reservoir in a concentration effective to capture heavy metals contained therein. The polymer concentration in the reservoir is preferably from about 40 ppb to about 100 ppm. The polyester may be incorporated in a cleaning composition containing from about 0.05 to about 8% of the polymer and up to about 15% of a surfactant In a particularly preferred embodiment, the composition contains a perfume which the polymer sequesters, and which is released from the polyester in the reservoir and at the concentrations of the polymer therein. A major portion of the perfume, generally insoluble in water, floats to the surface of the water, and is then evaporatable, imparting a pleasing fragrance to the atmosphere.

DETAILED DESCRIPTION OF THE INVENTION

Public water supplies as well as private water supplies, for example, water from wells, contain trace levels of various heavy metal ion impurities, including, for example, $Fe^{+++}$, $Mn^{+++}$ and $Cu^{++}$. Iron and copper pipe present in homes and commercial buildings also places heavy metal ions into the water supply. Over time the presence of such ions causes staining of reservoirs in the home and in commercial buildings, especially porcelain reservoirs such as toilet bowls, urinals, bathtubs, sinks, basins and the like. Typically, from about 0.5 to about 500 ppm of these heavy metal ions in the water supply is sufficient to cause staining.

In one type of cleaner for such reservoirs, an aqueous solution of an active cleaning constituent or mixture of such constituents, typically anionic or nonionic surfactants, is employed. These constituents clean the subject reservoir by solubilizing soil deposits. By and large, this type of cleaning solution is not effective in preventing staining by the offending heavy metal ions.

Another type of cleaning composition incorporates acids, e.g., hydrochloric acid, which ionize in solution, and which are effective in removing and/or preventing staining. Disadvantageously, most surfactants are not compatible with such acid constituent, and the stain-removing benefit of the acid cannot be combined with the cleaning power of the surfactant.

It has been found that certain polyester compounds are useful in retarding staining, when used in cleaning compositions of the first mentioned type, containing a surfactant or blend of surfactants.

The polyester polymer of the present invention are water-dissipatible, meltable polyesters of the type disclosed in Kibler et al U.S. Pat. Nos. 3,779,993 and 3,734,874; Coney U.S. Pat. No. 4,335,220; Sublett U.S. Pat. No. 4,233,196, and O'Neill U.S. Pat. No. 4,304,900 and 4,304,901, all of these patents being incorporated herein by reference thereto.

Accordingly, the reaction product of polymers suitable for use with the present invention may be the reaction product of (a) a difunctional dicarboxylic acid, (b) a difunctional sulfomonomer, and (c) a glycol or a mixture of glycol and diamine, the polymer having an inherent viscosity (as defined in Coney U.S. Pat. No. 4,335,220) of at least 0.1, preferably about 0.3, the term "inherent viscosity" referring to viscosity determinations made at 25° using 0.25 grams of polymer per 100 ml. of a solvent composed of 60% by weight phenol and 40% by weight tetrachlorethane.

The difunctional dicarboxylic acid reactant (a) can be aliphatic, alicyclic, and aromatic dicarboxylic acids, for example, succinic, glutaric, adipic, fumaric, maleic, 1,4-cyclohexanedicarboxylic, terephthalic, and phthalic acids. Mixtures of two or more acids can be used. The corresponding anhydrides, esters and acid chlorides of the above acids are also suitable.

The difunctional sulfomonomer reactant (b) can be a dicarboxylic acid or ester containing a metal sulfonate group or a hydroxy acid containing a metal sulfonate group. Preferably, the metal ion is an alkali metal. The difunctional sulfomonomer (b) include sulfophthalic, sulfoterephthatic, sulfoisophthalic, and 4-sulfonaphthalene-2,7-dicarboxylic acids, and their corresponding esters. Also suitable are metallosulfoaryl sulfonates, e.g., 5-sodiosulfoisophthalic acid.

Aliphatic, alicyclic and alkylaryl glycols are suitable as reactant (c) herein, and include ethylene glycol, propylene glycol, p-ethylenediol, 1,3-cyclohexanedimethanol and the like. Two or more glycols can be used in the synthesis of the polyesters suitable herein. Diethylene glycol is preferred.

The polyester polymers suitable in the compositions of the present invention have a molecular weight of from about 10,000 to about 25,000. An example of the aforementioned polyester is the "AQ" polyester series, manufactured by Eastman Chemical Products, Inc., especially AQ 55D, wherein the suffix "D" denotes a dispersion of the polymer. The AQ polymers are available as solid pellets or as aqueous dispersions. The dispersions typically comprise 20-35% solids, and have viscosities in the range of 10-50 cps at 100 rpm. Also suitable for use herein are the AQ29 and AQ38 polymers.

It has been found that the polyester polymers herein recite may be included within a surfactant containing composition used in the cleaning of reservoirs, especially toilet bowls, to lessen the tendency of di- and trivalent metal ions as may be present in the water supplied to the reservoirs from staining the surfaces thereof, especially porcelain surfaces. It is critical, however, that the cleaning composition in which the polyester is included not contain significant levels of ionizable species, for example, ionizable acids, as the polymers are destabilized at higher ionic strengths. Preferably, the ionic strength of the cleaning composition should be less than 0.5 mol/liter. When destabilized, the polymer precipitates, making it ineffective for its intended activity but also possibly preventing proper operation of the automatic dispenser preferably used to deliver the composition to the reservoir.

The aqueous cleaning composition of the present invention comprises on a weight basis from about 1 to about 15%, preferably from about 2 to about 8%, of a nonionic or anionic surfactant and mixtures thereof; from about 0.05% to about 10% (active basis), preferably from 0.1 to about 3%, of the polyester polymer, and water. While optional, it is quite preferable to include perfume, typically less than about 2%, more specifically between 0.05 to 1.0% by weight, of an oil based perfume, and a dye, typically less than 5%, more specifically between 0.25 and 2% by weight. The polymer is provided as a dispersion in the cleaning composition.

It has been further found that perfumes included in the cleaning composition are sequestered by the polyester. This is demonstrated by the low intensity fragrance exhibited by perfume containing compositions of the present invention, prior to dilution in the reservoir.

Advantageously, when the cleaning composition is diluted, as by use in a water containing reservoir, there is a release or "bloom" of the perfume. While the mechanism is not fully understood, it is believed that the polymer, when present in aqueous solutions at quite dilute levels, either unravels to release the perfume or releases the perfume to preferentially capture the heavy metal ion. Preferably, the concentration of the polymer in aqueous solution in the reservoir suitable to obtain release of the perfume is from about 40 parts per billion to about 100 parts per million, most preferably from about 1 to about 50 ppm. Importantly, it has been found that dilution of the polymer as described above does not prevent capture of the offending heavy metal ions.

Any anionic, nonionic, cationic, amphoteric, or zwitterionic surfactant is suitable in the composition of the present invention, provided that ionization is insufficient in the case of the ionizable surfactants to interfere with the intended function of the polymer. Generally, however, the ionizable surfactants have a low degree of dissociation and, accordingly, do not jeopardize the activity of the polymer. Anionic and nonionic surfactants are especially preferred.

Broadly, the anionic surfactants are water-soluble alkyl or alkylaryl compounds, the alkyl having from about 8 to about 22 carbons, including a sulfate or sulfonate substituent group that has been base-neutralized, typically to provide an alkali metal, e.g., sodium or potassium, or an ammonium anion, including, for example: (1) alkyl and alkylaryl sulfates and sulfonates having preferably 10 to 18 carbons in the alkyl group, which may be straight or branched chain, e.g., sodium lauryl sulfate and sodium dodecylbenzene sulfonate; (2) alpha-olefin aryl sulfonates preferably having from about 10 to 18 carbons in the olefin, e.g., sodium $C_{14-16}$ olefin sulfonate, which is a mixture of long-chain sulfonate salts prepared by sulfonation of $C_{14-16}$ alpha-olefins and chiefly comprising sodium alkene sulfonates and sodium hydroxyalkane sulfonates; (3) sulfated and sulfonated monoglycerides, especially those derived from coconut oil fatty acids; (4) sulfate esters of ethoxylated fatty alcohols having 1-10 mols ethylene oxide, e.g., sodium polyoxyethylene (7 mol EO) lauryl ether sulfate, and of ethoxylated alkyl phenols having 10 mols ethylene oxide and 8 to 12 carbons in the alkyl, e.g., ammonium polyoxyethylene (4 mol EO) nonyl phenyl ether sulfate; (5) base-neutralized esters of fatty acids and isethionic acid, e.g., sodium lauroyl isethionate; (6) fatty acid amides of a methyl tauride, e.g., sodium methyl cocoyl taurate, (7) beta-acetoxy- or beta-acetamido-alkane sulfonates where the alkane has from 8 to 22 carbons, and (8) acyl sarcosinates having from 8 to 18 carbons in the acyl, e.g., sodium lauroyl sarcosinate.

The nonionics include (1) fatty alcohol alkoxylates, especially the ethoxylates, wherein the alkyl group has from 8 to 22, preferably 12 to 18, carbons, and typically 6 to 15 mol alkoxide per molecule, e.g., coconut alcohol condensed with about nine mols ethylene oxide; (2) fatty acid alkoxylates having from about 6 to about 15 mols alkoxylate, especially the ethoxylate; (3) alkylphenoxy alkoxylates, especially the ethoxylates, containing 6 to 12 carbons, preferably octyl or nonyl, in the alkyl, and having about 5 to 25, preferably 5 to 15 mols alkylene oxide per molecule, e.g., nonyl phenol ethoxylated with about 9.5 mols ethylene oxide (Igepal CO-630); (4) condensates of ethylene oxide with a hydrophobic base formed by condensation of propylene oxide with propylene glycol, e.g., nonionic surfactants of the Pluronic series manufactured by BASF Wyandotte, (5) condenaates of ethylene oxide with an amine or amide; (6) fatty amine oxides, e.g., stearyl dimethyl amine oxide, and (7) alkylolamides.

Preferred anionics are the alkyl and alkylauryl sulfates and the alpha-olefin aryl sulfonates, while preferred nonionics are the fatty alcohol ethoxylates and the alkyl phenoxy ethoxylates. Preferred dyes are FD&C Blue No.1 (Colour Index No. 42,090), FD&C Green No. 3 (Colour Index No. 42,053), Acid Blue 249 (Colour Index No. 74220), and Colour Index No. 52,015.

Typically, the perfume preferably incorporated in the composition of the present invention is a mixture of organic compounds admixed so that the combined odors of the individual components produce a pleasant o desired fragrance. While perfumes are generally mixtures of various materials, individual compounds may also be used as the perfume ingredient. The perfume compositions generally contain a main note or the "bouquet" of the perfume composition, modifiers which round off and accompany the main note, fixatives including odorous substances that lend a particular note to the perfume throughout each of the stages of evaporation, substances which retard evaporation, and top notes which are usually low-boiling, fresh-smelling materials.

Perfumery raw materials may be divided into three main groups: (1) the essential oils and products isolated from these oils; (2) products of animal origin; and (3) synthetic chemicals.

The essential oils consist of complex mixtures of volatile liquid and solid chemicals found in various parts of plants. Mention may be made of oils found in flowers, e.g., jasmine, rose, mimosa, and orange blossom; flowers and leaves, e.g., lavender and rosemary; leaves and stems, e.g., geranium, patchouli, and petitgrain; barks, e.g., cinnamon; woods, e.g., sandalwood and rosewood; roots, e.g., angelica; rhizomes, e.g., ginger; fruits, e.g., orange, lemon, and gergamot; seeds, e.g., aniseed and nutmeg; and resinous exudations, e.g., myrrh. These essential oils consist of a complex mixture of chemicals, the major portion thereof being terpenes, including hydrocarbons of the formula $(C_5H_8)_n$ and their oxygenated derivatives. Hydrocarbons such as these give rise to a large number of oxygenated derivatives, e.g., alcohols and their esters, aldehydes and ketones. Some of the more important of these are geraniol, citronellol and terpineol, citral and citronellal, and camphor. Other constituents include aliphatic aldehydes and also aromatic compounds including phenols such as eugenol. In some instances, specific compounds may be isolated from the essential oils, usually by distillation in a commercially pure state, for example, geraniol and citronellal from citronella oil; citral from lemon-grass oil; eugenol from clove oil linalool from rosewood oil; and safrole from sassafras oil. The natural isolates may also be chemically modified as in the case of citronellal to hydroxy citronellal, citral to ionone, eugenol to vanillin, linalool to linalyl acetate, and safrol to heliotropin.

Animal products used in perfumes include musk, ambergris, civet and castoreum, and are generally provided as alcoholic tinctures.

The synthetic chemicals include not only the synthetically made, also naturally occurring isolates mentioned above, but also include their derivatives and compounds unknown in nature, e.g., isoamylsalicylate, amylcinnamic aldehyde, cyclamen aldehyde, heliotropin, ionone, phenylethyl alcohol, terpineol, undecalactone, and gamma nonyl lactone.

Perfume compositions as received from the perfumery house may be provided as an aqueous or organically solvated composition, and may include as a hydrotrope or emulsifier a surface-active agent, typically an anionic or nonionic surfactant, in minor amount. The perfume compositions are quite usually proprietary blends of many different fragrance compounds. However, one of ordinary skill in the art, by routine experimentation, may easily determine whether such a proprietary perfume blend is suitably sequestered by the polyester in the compositions of the present invention.

The polyester polymer herein described are dispersible, not soluble, in water. The polymers are not easily dissipated in cold water, although in some instances cold water is preferred, depending on the particular reactants employed. Typically, dispersions of the polymer are made by adding solid polymer to water heated to about 175 to about 190° F., accompanied by stirring. The aforementioned Coney, Kibler, et al., and Sublett patents describe in greater detail preparation of these polymer dispersions.

A perfume-complexed polyester may be made by subsequently adding the perfume or a perfume solution to the cooled dispersion under conditions of shear.

It is preferred to admix an aqueous premix of the surfactant to the cooled polymer dispersion or the perfume-complexed polymer dispersion, under conditions of stirring.

When used as a toilet cleaning product, the composition of the present invention is preferably dispensed into the toilet tank on the occasion of a flush, the volume of water in the tank being sufficient to achieve adequate dilution to the concentration levels at which the polymer releases the perfume, for a perfume-complexed polymer. Suitable for use in combination with the subject composition is the dispenser described in Mack U.S. Pat. No. 3,698,021. Also suitable is the dispenser disclosed in M. McElfresh U.S. Pat. No. 4,660,231, which is an example of a downstroke dispenser and discharges composition as the tank water level drops as a result of a flush. The Mack device is an upstroke dispenser that discharges composition as the tank water level rises during refilling of the tank, in which case the tank is the primary reservoir and the entire tank water volume is treated as to remove the offending ions.

What is claimed is:

1. An in-tank toilet dispenser containing a cleaning composition and adapted to release an effective cleaning amount of said composition into the toilet, said composition comprising up to about 15% surfactant, and from about 0.05 to about 10% by weight of the water-dissipatable polyester polymer which is the reaction product of (a) a difunctional dicarboxylic acid, (b) a difunctional sulfomonomer, and (c) a glycol or a glycol and diamine mixture, the polyester having an inherent viscosity of at least 0.1, the cleaning composition containing above about 65% water, the amount of said composition released from the dispenser being sufficient to provide a polymer concentration of from about 40 ppb to about 100 ppm, whereby heavy metal ions are captured by the polymer to inhibit staining.

2. The dispenser of claim 1 wherein the reactant (a) is selected from the group consisting of succinic, glutaric, adipic, fumaric, maleic, 1,4-cyclohexanedicarboxylic, phthalic and terephthalic acids; the reactant (b) is selected from the group consisting of sulfophthalic, sulfoterephthalic, sulfoisophthalic and 4-sulfonaphthalene-2,7-dicarboxylic acids, and the reactant (c) is selected from the group consisting of ethylene glycol, diethylene glycol, propylene glycol, p-ethylenediol and 1,3-cyclohexanedimethanol.

3. The dispenser of claim 2 wherein the polymer has an inherent viscosity of above about 0.3.

4. The dispenser composition of claim 2 wherein the polymer molecular weight is from about 10,000 to about 25,000.

5. The cleaning composition of claim 1 further comprising a perfume, the perfume being sequestered by said polyester.

6. The dispenser of claim 5 wherein the reactant (a) is selected from the group consisting of succinic, glutaric, adipic, fumaric, maleic, 1,4-cyclohexanedicarboxylic, phthalic and terephthalic acids; the reactant (b) is selected from the group consisting of sulfophthalic, sulfoterephthalic, sulfoisophthalic and 4-sulfonaphthanene-2,7-dicarboxylic acids, and the reactant (c) is selected from the group consisting of ethylene glycol, diethylene glycol, propylene glycol, p-ethylenediol and 1,3-cyclohexanedimethanol.

7. The dispenser of claim 6 containing from about 0.1 to 3% polyester, from about 0.05 to about 1.0% perfume, and from about 1% to 8% surfactant.

8. The dispenser of claim 7 wherein the perfume comprises an essential oil.

9. The dispenser of claim 7 wherein the perfume comprises a fragrance constituent selected from the group consisting of geraniol, citronellol, terpineol, citral, citronellal, eugenol, ionone, isobornyl acetate, isoamyl salicylate, methyl salicylate, gamma nonyl lactone, and mixtures thereof.

* * * * *